United States Patent [19]

Moore

[11] 4,092,277
[45] May 30, 1978

[54] METHOD FOR PRODUCING CHEMICALLY STABLE UREA-FORMALDEHYDE FOAMS

[75] Inventor: William Percy Moore, Hopewell, Va.

[73] Assignee: Waverly Chemical Co., Hopewell, Va.

[21] Appl. No.: 849,109

[22] Filed: Nov. 7, 1977

Related U.S. Application Data

[63] Continuation of Ser. No. 761,321, Jan. 21, 1977, abandoned.

[51] Int. Cl.$^2$ ............................. C08J 9/30; C08J 9/12
[52] U.S. Cl. ............................... 260/2.5 F; 260/70 R; 260/71; 260/849
[58] Field of Search ..................................... 260/2.5 F

[56] References Cited

U.S. PATENT DOCUMENTS

| | | | |
|---|---|---|---|
| 2,559,891 | 7/1951 | Meyer | 260/2.5 F |
| 3,256,067 | 6/1966 | Shriver et al. | 260/2.5 F |
| 3,377,139 | 4/1968 | MacGregor et al. | 260/2.5 F |

*Primary Examiner*—Morton Foelak

[57] ABSTRACT

Method of producing a substantially chemically stable urea-formaldehyde foam which comprises preparing a partially cured aqueous urea-formaldehyde resin, modifying the partially cured resin by reacting at pH 4.5 – 5.5 and 70°–110° C with aqueous dialdehyde containing two to six molecular carbons and additional urea with each additive amounting to 1–5 per cent by weight of the modified resin, neutralizing the modified resin to pH 6.7 – 7.5 by addition of aqueous alkali hydroxides or carbonates, combining said neutral modified resin with a froth produced by forcing air through a dilute acidic aqueous surfactant solution to re-activate and complete the cure of the modified resin in the foam, and drying the foam.

Glyoxal is the preferred dialdehyde for modifying the urea-formaldehyde foam resin because of its effectiveness at increasing chemical stability of the foam at levels as low as 1.0 per cent.

3 Claims, No Drawings

METHOD FOR PRODUCING CHEMICALLY STABLE UREA-FORMALDEHYDE FOAMS

This is a continuation, of application Ser. No. 761,321, filed Jan. 21, 1977, and now abandoned.

BACKGROUND OF THE INVENTION

This invention relates to chemically stable urea-formaldehyde forms, and more particularly to a method whereby chemical stability is increased by modification of the partially cured urea-formaldehyde resin by acid catalyzed reaction with water soluble dialdehydes and supplemental urea. The said modified resin when combined with a froth, produced by forcing air through a dilute acidic aqueous surfactant solution, after application and placement, cures and dries to a light weight contiguous foam mass having a high degree of chemical stability. Such foams are used for heat and sound insulation in commercial and residential buildings where foam stability over long periods of time is essential.

Urea-formaldehyde foams after curing and drying are relatively light weight, and possess good heat and sound insulating properties. The foams are normally applied as a wet, partially cured, fluid froth which flows into and accurately fills areas or cavities to be insulated. The prior art has reported solution to many of the problems relating to applicaton, such as production of uniform foam cell size and constant composition of the resin-curing agent blend. The excellent insulating properties, the relatively low cost, and the ease and accuracy of application are factors which should allow urea-formaldehyde foams to become a major commercial insulation material.

Unfortunately, urea-formaldehyde foams developed to date and reported in the prior art do not have the integrity required for commercial utility. Integrity is used here to indicate an ability to remain constant and unchanged throughout long periods of use as insulation. The prior art foams have lacked both physical and chemical integrity under normal use conditions. That is, the physical size, shape, contiguality, appearance, crystallinity, and the chemical composition of the urea-formaldehyde foams have changed significantly to the detriment of their insulating effectiveness. These conventionally prepared urea-formaldehyde foams, therefore, produce inferior insulation after the foams have lost their physical and chemical integrity.

Copending U.S. application, by this inventor, filed the same day as this application, discloses that the physical integrity, including physical size, shape, contiguality and appearance of urea-formaldehyde foam, may be preserved for long useful periods of time by incorporating linearly shaped refractory solid particles in the foam during application. Although preservation of the physical integrity of the foam provides a significant improvement in the utility of urea-formaldehyde foams, it does not provide a completely satisfactory insulating material, where chemical instability and degradation of the foam occurs.

Urea-formaldehyde polymers in conventional foams chemically decompose slowly under normal insulating conditions and the decomposition becomes more rapid as temperature and humidity are increased. The chemical decomposition of the foam seriously impairs the utility of the foam insulation by breaking down the cellular structure of the foam to a crystalline solid structure having little physical strength, and poor insulating properties. Objectionable odors are created by formaldehyde vapors released by the chemical degradation of the urea-formaldehyde polymers.

It is therefore a primary object of this invention to provide a method of producing a substantially chemically stable urea-formaldehyde based insulating foam.

It is another object of this invention to provide a method for modifying urea-formaldehyde resins for use in forming chemically stable insulating foams.

It is still another object of this invention to provide a method of producing a cured urea-formaldehyde insulating foam substantially free from formaldehyde vapor and odor.

These and other objects will be evident from the following description of the invention.

SUMMARY OF THE INVENTION

It has now been discovered that the foregoing objects can be accomplished and a chemically stable urea-formaldehyde insulating foam produced by preparing a partially cured aqueous urea-formaldehyde resin, modifying the partially cured resin by reaction with a water soluble dialdehyde and additional urea in the presence of an acid catalyst, neutralizing the modified resin by addition of aqueous alkali, combining said neutral modified resin with frothed curing agent produced by forcing air through a dilute acidic aqueous surfactant solution, dispensing the combined fluid foam thus formed into a contiguous shape while the curing reaction continues, completing the cure, and drying. Surprisingly, the foam prepared by this method is so chemically stable that its chemical composition is virtually unchanged long after application, cure, and drying. Even more surprising is the effectiveness of the chemical stabilization even in moist exposed areas, such as the foam surfaces in open house attics, when compared to conventional urea-formaldehyde foams. The exposed area of conventional foams begin to lose formaldehyde shortly after their application, and after a year the mol ratio of formaldehyde to urea has been reduced significantly, causing the foam cells to disentegrate into amorphous solids and crystals which have little load-bearing strength and poor insulating properties. The foam produced by the method of this invention employing the dialdehyde urea modified resin, is virtually unchanged chemically even on the exposed surfaces under said warm, moist conditions.

It has not yet been discovered exactly why the modification reaction of the partially cured urea-formaldehyde resin with low molecular weight dialdehydes and additional urea, chemically stabilizes the final cured urea-formaldehyde resin and the insulating foam containing the said resin. It has been postulated, but not yet proven, that the dialdehydes and urea react onto the end of the partially cured urea-formaldehyde polymer chains thereby occluding the more labile formaldehyde in the less available center portion of the polymer chain. What is known at this point, is that reaction of a relatively small amount of dialdehyde and urea with a partially cured urea-formaldehyde greatly improves the long term chemical stability of insulating foams made from the resin.

In carrying out the method, according to my invention, a partially cured urea-formaldehyde solution is prepared in a conventional manner having a formaldehyde to urea mol ratio between 1.5 and 2.0 and a solids content between 10 to 65% by weight. Although viscosity of the partially cured urea-formaldehyde resin is not critical, to the method, is should be low enough to allow convenient handling, and is normally 25 to 50 centipoise at 25° C. In the preferred method, the partially cured urea-formaldehyde resin is prepared, as follows: Urea-formaldehyde concentrate, containing 85% solids and 15% water, and urea are dissolved in water to form a solution containing about 2 mols formaldehyde to 1 mol urea and about 60% total solids. The pH of the solution is brought to 5.0 by addition of phosphoric acid and temperature is increased to about 90° C, where the curing reaction is continued until viscosity of the solution increases to about 40 centipoise at 25° C. Maximum cooling is applied to cool the partially cured resin to 45° C. The partially cured resin may be neutralized by the addition of sodium hydroxide for storage and subsequent use in foam resin production or the partially cured resin may be reacted immediately to modify it for use as foam resin. The term partially cured resin is used here to denote a urea-formaldehyde solution which has been polymerized sufficiently that the physical properties of the original ingredients are no longer evident, and the viscosity has increased to the point of 20 to 80 centipoise where the pumping and pouring properties have changed from those of the original ingredients. The partially cured resins are clear liquid polymers which have not reached the high molecular weights required to form the final solid urea-formaldehyde foams.

Aqueous dialdehyde solution, preferably glyoxal solution, and aqueous urea solution are reacted with the partially cured resin at 45° C for about 10 minutes at pH 5.0, until the dialdehyde and urea have reacted with and modified the partially cured resin, as indicated by an increase in viscosity to about 60 centipoise at 25° C. The mixture is neutralized to pH 7.1 quickly, when said viscosity is reached. The amount of dialdehyde added is sufficient to provide between 1 and 5% of dialdehyde in the modified foam resin. The amount of urea added is sufficient to provide a mol ratio of formaldehyde to urea between 1.3 and 1.5 in the final modified foam resin.

The resulting modified foam resin may be used directly for producing urea-formaldehyde foams having improved chemical stability, modified further by addition of other additives prior to use, or stored for later use.

To produce chemically stable urea-formaldehyde foam, the modified partially cured resin is quickly, completely, and continuously combined with a frothed curing agent, produced by forcing air through a dilute aqueous acid surfactant. In the preferred method about 2 parts of curing agents is frothed and combined with 1 part of modified resin. The curing agent is a dilute aqueous solution containing about 1% sulfuric acid and about 2% of a foam-forming surfactant, preferably an alkyl polyoxyethylene ether or alkyl benzene sulfonic acid. The term froth is used to denote a temporary foam, well drained of excess liquid, and separated upwardly from the liquid from which it is generated by the passage of air through an aperture located in the bottom of the said liquid. Chemically stable urea-formaldehyde foams are produced with froth volumes amounting to between 30 and 75 times the volume of curing agent solution. The preferred method of producing chemically stable foam generates about 60 volumes of froth per volume of liquid curing agent used.

When the neutral modified partially cured resin is combined with the frothed curing agent, the curing of the resin is activated and the foam is dispensed continuously as a fluid to form contiguous masses where insulation is desired. The curing reaction proceeds rapidly so that fluidity is lost in about 10 to 20 seconds and the foam is firm to the touch and is self-supporting in about 45 to 60 seconds. Cure of the resin continues while the foam dries. The rate of drying depends almost totally upon ambient conditions. Under normal building insulation conditions, drying is nearly complete in 5 to 10 days after application.

The efficacy of the dialdehydes containing 2 to 6 molecular carbons and urea in increasing the chemical stability of urea-formaldehye is surprising. Reaction with monoaldehydes, such as butyraldehyde and glycols, such as ethylene glycol made no improvement in chemical stability of foam and undesirably retarded the cure rate of the foam. Dialdehydes containing more than 6 carbon atoms were ineffective for increasing chemical stability, for reasons not completely understood. The low solubility, low reactivity, and low purity of the compounds available, probably contributed to the failure of these high molecular weight dialdehydes.

It is necessary that some urea be reacted with the dialdehyde when the partially cured resin is modified. When the dialdehyde is reacted alone, storability of the partially cured modified resin is reduced to impractically short periods. Although chemical stability of urea-formaldehyde foams are increased slightly by reaction of 2% glyoxal alone with the partially cured resin, the useful storage life of the resin is reduced to only several days. The reaction of 2% urea, in addition to the glyoxal, to the same resin, produces a further increase in chemical stability of the foam, and increases the useful storage life of the modified resin to several months.

Modification of the partially cured resin with urea without the dialdehyde, causes a reduction in chemical stability of the foam. Use of other nitrogen compounds, such as melamine, in place of additional urea, improves chemical stability of the foam, but to a lesser extent than urea and decrease the storability of the partially cured resin. Preferred mol ratio of dialdehyde to urea reacted with the partially cured resin is 0.5 to 1.0 mol.

The resin modification reaction is rapid. It is necessary to carry out the said reaction at relatively low temperatures between 25° and 50° C. At higher reaction temperatures, such as the 90° C temperature urea-formaldehyde reaction temperature, the reaction proceeds so rapidly that complete solidification of the reactants is possible before the reaction can be stopped by neutralization.

The acid used to catalyze the modification is not critical so long as the pH of the reaction mixture can be decreased without addition of large amounts of material which will eventually form salts in the finished foam product. Phosphoric and sulfuric acids have been found to be satisfactory for this use.

The generation of the curing agent froth, combination of the froth with the modified resin, and dispensing the combined foam is best carried out at temperatures between 0° C and 40° C at pressure between 1 and 3 atmospheres. Lower temperatures than 0° C reduce the cure rate of the modified resin so that collapse of the temporary foam is likely before it has cured to the point of self support. Drying of the dispensed foam is so rapid at temperatures above 40° C that shrinkage of the foam becomes a significant undesirable factor. Convenience in the operation of the foam producing devices rather than actual effects on chemical stability of the foam is the reason for choosing pressures near 1 atmosphere as the preferred pressure for urea-formaldehyde foam production.

The method for producing chemically stable urea-formaldehyde foams starting from unpolymerized urea and formaldehyde is preferred from standpoint of quality control, but it is quite possible to produce chemically stable foam by modifying any partially cured urea-formaldehyde resin by reaction with dialdehyde and additional urea so long as the partially cured urea-formaldehyde resin has the properties described in the above.

DESCRIPTION OF THE PREFERRED EMBODIMENTS

The following specific examples illustrate the effectiveness of the method of this invention for producing chemically stable urea-formaldehyde foams with regard to details of the method employed and chemical stability of the foams produced. All parts are by weight unless otherwise specified. It is to be understood that these examples are merely illustrative and there is no intent to limit the invention thereto.

EXAMPLE 1

A partially cured aqueous urea-formaldehyde resin was prepared by adding, at ambient temperature, 1600 parts crystal urea, 2490 parts water, and 2770 parts of urea-formaldehyde concentrate-85 (a mixture of urea and formaldehyde equivalent to 60% formaldehyde, 25% urea and 15% water) in a stainless steel reactor, equipped with agitator and circular pump, and with a jacket for heating and cooling.

Steam was applied to the jacket and temperature of the well agitated mixture was increased to 82° C. Then 3.5 parts of 75% furnace grade orthophosphoric acid was added to decrease the pH of the mixture to 5.0. Polymerization reaction started as soon as the acid was added and temperature increased to 93° C, where it was controlled by circulating cooling water through the reactor jacket. Checks were made on the viscosity of the mixture as the reaction proceeded. Original viscosity of the mixture was 10 centipoise, at 25° C. After 25 minutes reaction time, viscosity of the reaction mixture had increased to 35 centipoise at 25° C, and maximum cooling was immediately applied to the reactor jacket to reduce temperature to 45° C in 10 minutes. Viscosity was then measured to be 40 centipoise at 25° C.

As soon as reaction temperature reached 45° C, 110 parts of glyoxal in 175 parts water, and 108 parts urea in 162 parts water were added while agitation and cooling were continued, and pH was maintained at 5.0 by adding small additional amounts of 75% orthophosphoric acid. Viscosity of reaction mixture increased to 60 centipoise at 25° C in 10 minutes reaction time. When viscosity reached 60 centipoise, 20% aqueous sodium hydroxide solution was immediately added to neutralize the mixture of pH 7.1 and maximum cooling was applied to bring the reaction mixture to ambient temperature. Dipropylene glycol amounting to 508 parts was added while agitation was continued. pH of the final modified resin mixture was adjusted to pH 7.1 after ambient temperature was reached by adding a small amount of sodium hydroxide solution.

EXAMPLE 2

A resin-curing solution was prepared by mixing in an open fiber glass tank equipped with a circulating pump, ingredients as follow: water, 97.5 parts; 98% sulfuric acid, 0.5 parts; and "Flo-Mo" surfactant (80% alkyl polyoxyethylene ether), 2.0 parts.

EXAMPLE 3

The curing solution from example 2 was converted to a froth by forcing air at a rate of 7 ft$^3$/minute through nozzles in a circular air sparger located along the bottom of a frothing chamber, which consisted of a 12 inch diameter cylinder, 24 inch tall. Liquid level was automatically maintained 4 inches above the level of the air sparger by curing solution pumps activated by a level control device located on the side of the froth chamber. The froth rose continuously from the liquid surface, filled the upper portion of the chamber while excess liquid drained back to the liquid surface, and then left the froth chamber through a single 2 inch diameter nozzle located in the center of the sealed top cover of the froth chamber. The froth was carried by flexible 2 inch diameter polyvinylidene chloride hose to a blending device to meet the modified partially cured resin. The volume of temporary froth produced was about 70 times as great as the volume of curing solution fed to the froth chamber.

The modified partially cured urea-formaldehyde resin prepared in example 1 was continuously supplied by a metering pump from a reservoir to a blending device. The blending device consisted of a ⅜ inch schedule 10 stainless steel pipe welded concentrically into a 1½ inch schedule 10 stainless steel pipe so that the temporary froth entered through the top and the modified partially cured resin entered through the ⅜ inch pipe from the side. The ⅜ inch pipe resin inlet line extended along the centerline of the 1½ inch pipe to a point ½ inch from the discharge end. At the discharge end of the blending device a flexible 1½ inch diameter polyvinylidene hose 25 feet long was attached, for completing the blending of the foam and for dispensing it. minute. the resin and temporary curing froth comingled as they passed through the blending device and the dispensing hose. Curing of the modified partially cured resin was reactivated when it was blended with the frothed curing agent. The blended foam left the dispensing tube in a continuous stream and was used to form contiguous masses of insulation for completion of curing and drying in wall cavities, attics, and into test panels and containers where properties could be accurately determined during accelerated and actual aging tests and evaluations.

EXAMPLE 4

Urea-formaldehyde foams were prepared from the partially cured resin prepared in example 1. The curing solution of example 2 was used in preparing the foam, by combining it with the partially cured resin. The combination technique of example 3 was used to produce the foam. The foam formed by the techniques detailed in examples 1, 2, and 3 was dispensed into two simulated wall panels 4 feet wide, 8 feet long and 4 inches thick. The panels were formed by using four 2 inch × 4 inch timbers located on 16 inch centers, closed on each end by a 2 inch × 4 inch timber. The back of these panels were closed with standard grade ½ inch plywood sheets. The front of panel number 1 was left open, and the front of panel 2 was covered by ½ inch thick paper covered gypsum wall board.

Both panels were filled with foam, allowed to dry, and stored in the attic of a building located in eastern Virginia. Temperatures were as high as 120° F in the summer and as low as 8° F in the winter, and humidity varied widely and frequently from 100° to 15%. An identical series of panels were prepared using the same urea-formaldehyde resins which has not been modified by reaction with dialdehydes and additional urea, but had simply been adjusted to the same urea-formaldehyde mol ratio. After a one year storage period running from March 1 to March 1, samples of the foam were taken along interfaces of the foam with the atmosphere and analyzed chemically to determine the urea-formaldehyde mol ratio and to thus determine the amount of polymer degradation which had occurred. The results, with the unmodified resin panels designated U, are tabulated with regard to panel numbers as follows:

| Panel Number | Formaldehyde/Urea Mol Ratio | |
|---|---|---|
| | Original | After 1 Year |
| 1 | 1.35 | 1.31 |
| 2 | 1.35 | 1.34 |
| 1 U | 1.35 | 1.03 |
| 2 U | 1.35 | 1.22 |

The open panel containing the unmodified resin foam had very crystalline surfaces to the depth of about ½ inch while the closed panel crystalline urea was about ½ inch. The surfaces of the modified resin foams were harder than the internal part of the foam but still retained foam cells, as determined by microscopic examination.

EXAMPLE 5

A commercial partially cured spray dried urea-formaldehyde resin prepared by the process of U.S. Pat. No. 3,470,115 was obtained which contained 2.5% moisture and had a formaldehyde to urea mol ratio of 1.98. A total of 60 parts of solid resin were added to 40 parts of water.

Temperature was increased to 50° C and 0.5 parts of 75% ortho phosphoric acid was added to bring pH of partially cured resin solution to 5.1. Viscosity of the partially cured resin at this point was 31 centipoise at 25° C.

As soon as the temperature reached 50° C, 5 parts of succindialdehyde in 20 parts of water, and 5 parts of urea in 12 parts of water were added while agitation and cooling were continued at pH 5.0. In 12 minutes viscosity of the reaction mixture had increased to 55 centipose at 25° C, and the mixture was neutralized to pH 7.4 by direct addition of potassium hydroxide pellets to the reaction mixture and maximum cooling was applied to the jacket of the reactor.

The modified partially cured urea-formaldehyde resin was converted into dry foam by the methods used in examples 2, and 3 to form contiguous masses.

EXAMPLE 6

Some of the foam produced in example 5 was dispensed as a contiguous mass in open-topped 24 inch square boxes 3⅝ inches deep. These boxes were cured for 48 hours, then placed in a large oven where the humidity was maintained at 95% and ambient temperature was maintained at 100° F. Similar foam was produced from the unmodified spray dried resin, with only the urea-formaldehyde ratio adjusted, to evaluate the effect of the dialdehyde-urea modification of the partially cured resin.

After 120 days, the top surface of the foam produced from the unmodified resin was degraded to a depth of about 1 inch while the foam produced from the dialdehyde-urea modified resin maintained a hard crust with a virtually intact cellular structure.

While the above describes the preferred embodiments of my invention, it will be understood that variations may be made therefrom within the scope of the specifications and claims.

I claim:

1. A method of producing a chemically stable urea-formaldehyde foam which comprises preparing a partially cured aqueous urea-formaldehyde resin having a formaldehyde to urea mol ratio between 1.5 and 2.0 and a solids content of 40 to 65 percent by weight, modifying said partially cured resin by reaction at a temperature of about 50° C and a pH of about 5 with a water soluble aliphatic dialdehyde containing between 2 to 4 skeletal carbons and amounting to between 1 and 5 percent of the modified resin weight, and with the additional urea required to produce a formaldehyde to urea mol ratio between 1.3 and 1.5 in the modified resin, neutralizing the modified partially cured resin to a pH between 7.0 and 8.5, and combining said neutralized resin with foamed cured agent solution produced by forcing air through a dilute aqueous solution containing about 1 percent water soluble acid and a surfactant.

2. A method for producing a chemically stable urea-formaldehyde insulating foam which comprises preparing a partially cured aqueous urea-formaldehyde resin having a formaldehyde to urea mol ratio between 1.5 and 2.0, a solids content between 40 and 65 percent by weight and a viscosity between 25 and 50 centipoise at 25° C, by dissolving urea and formaldehyde in water, heating to a temperature of about 90° C, adding acid to decrease pH to about 5, continuing to heat until viscosity of the clear partially cured resin is about 40 centipoise at 25° C, cooling to 45° C and modifying said partially cured resin by reaction with aqueous glyoxal amounting to between 1 and 5 percent of the modified resin, and the additional urea required to produce a formaldehyde to urea mol ratio of between 1.3 and 1.5 in the modified resin, neutralizing to a pH between 7.0 and 8.5, combining one part of said modified resin with about 2 parts foamed curing agent produced by forcing air through a dilute aqueous solution containing about 1 percent sulfuric acid and about 2 percent alkyl polyoxyethylene ether, to form a fluid resinous foam, dispensing said combined foam in less than 20 seconds into contiguous masses for curing and drying.

3. A method of producing a chemically stable urea-formaldehyde insulating foam from aqueous partially cured, urea-formaldehyde resin which comprises adding phosphoric acid to aqueous partially cured resin to bring pH of said resin to about 5, heating to a temperature of about 50° C, modifying the partially cured resin by reacting with succindialdehyde and urea, each amounting to about 5 percent by weight of the modified resin, neutralizing said modified resin to a pH of 7.0 to 8.5 by direct addition of potassium hydroxide, rapidly combining about 1 part of the modified partially cured resin with about 2 parts of foamed curing agent solution produced by forcing air through a dilute aqueous solution containing about 1 percent sulfuric acid and about 2 percent alkyl benzene sulfonic acid to form a fluid resinous foam, dispensing said combined resinous foam in less than 20 seconds into contiguous masses for curing, drying, and use as insulation.

* * * * *